United States Patent [19]
Zavislan et al.

[11] Patent Number: 5,353,273
[45] Date of Patent: Oct. 4, 1994

[54] MULTI-CHANNEL OPTICAL HEAD AND DATA STORAGE SYSTEM

[75] Inventors: James M. Zavislan, Auburn, N.Y.; Bulent N. Kurdi, San Jose, Calif.

[73] Assignee: International Business Machines Corporation, Armonk, N.Y.

[21] Appl. No.: 926,061

[22] Filed: Aug. 4, 1992

[51] Int. Cl.⁵ ............................................. G11B 7/00
[52] U.S. Cl. ................................ 369/121; 369/44.21
[58] Field of Search ............... 369/102, 118, 120, 43, 369/44.12, 44.11, 44.14, 44.21, 44.23, 44.37, 44.41, 112, 122, 109, 110, 121

[56] References Cited

U.S. PATENT DOCUMENTS

| | | | |
|---|---|---|---|
| 4,520,472 | 5/1985 | Reno | 369/122 |
| 4,696,536 | 9/1987 | Albares et al. | 350/96.19 |
| 4,775,206 | 10/1988 | Erman et al. | 350/96.13 |
| 4,846,540 | 7/1989 | Kapon | 350/96.12 |
| 4,868,803 | 9/1989 | Sunagawa et al. | 369/44 |
| 4,870,651 | 9/1989 | Taneya et al. | 372/50 |
| 5,044,718 | 9/1991 | Kando | 385/4 |
| 5,130,965 | 7/1992 | Karaki et al. | 369/44.37 |
| 5,140,577 | 8/1992 | Ohsato | 369/44.41 |
| 5,195,070 | 3/1993 | Shiba et al. | 369/112 |
| 5,195,071 | 3/1993 | Funato et al. | 369/112 |
| 5,233,595 | 8/1993 | Kawakubo | 369/112 |

FOREIGN PATENT DOCUMENTS 383138  5/1990  European Pat. Off. .
287623  11/1989  Japan .
127623  5/1990  Japan .

OTHER PUBLICATIONS

Spear-Zino et al., "Multiwavelength monolithic integrated fiber optics terminal: an update", 1980.
Aiki, et al., IEEE Journal of Quantum Electronics, vol. QE-13, No. 4, Apr. 1977; "A Frequency Multiplexing Light Source with Monolithically Integrated Distributed-Feedback Diode Lasers".
English language abstract of Japanese Patent No. 127623; English language abstract of Japanese Patent No. 287623; English language abstract of European Patent No. 383138.

Primary Examiner—Paul M. Dzierzynski
Assistant Examiner—Don Wong
Attorney, Agent, or Firm—Baker, Maxham, Jester & Meador

[57] ABSTRACT

A multichannel optical head and data storage system employs an integrated-optical read channel. The read channel may be fabricated on a planar waveguide structure that separates the data signals of the multiple lasers. The read channel includes focus error sensors and track error sensors. The optical head may be used for amplitude recording systems such as phase-change erasable and write-once media, ablation media, dye-polymer media, and OD-ROM systems.

19 Claims, 3 Drawing Sheets

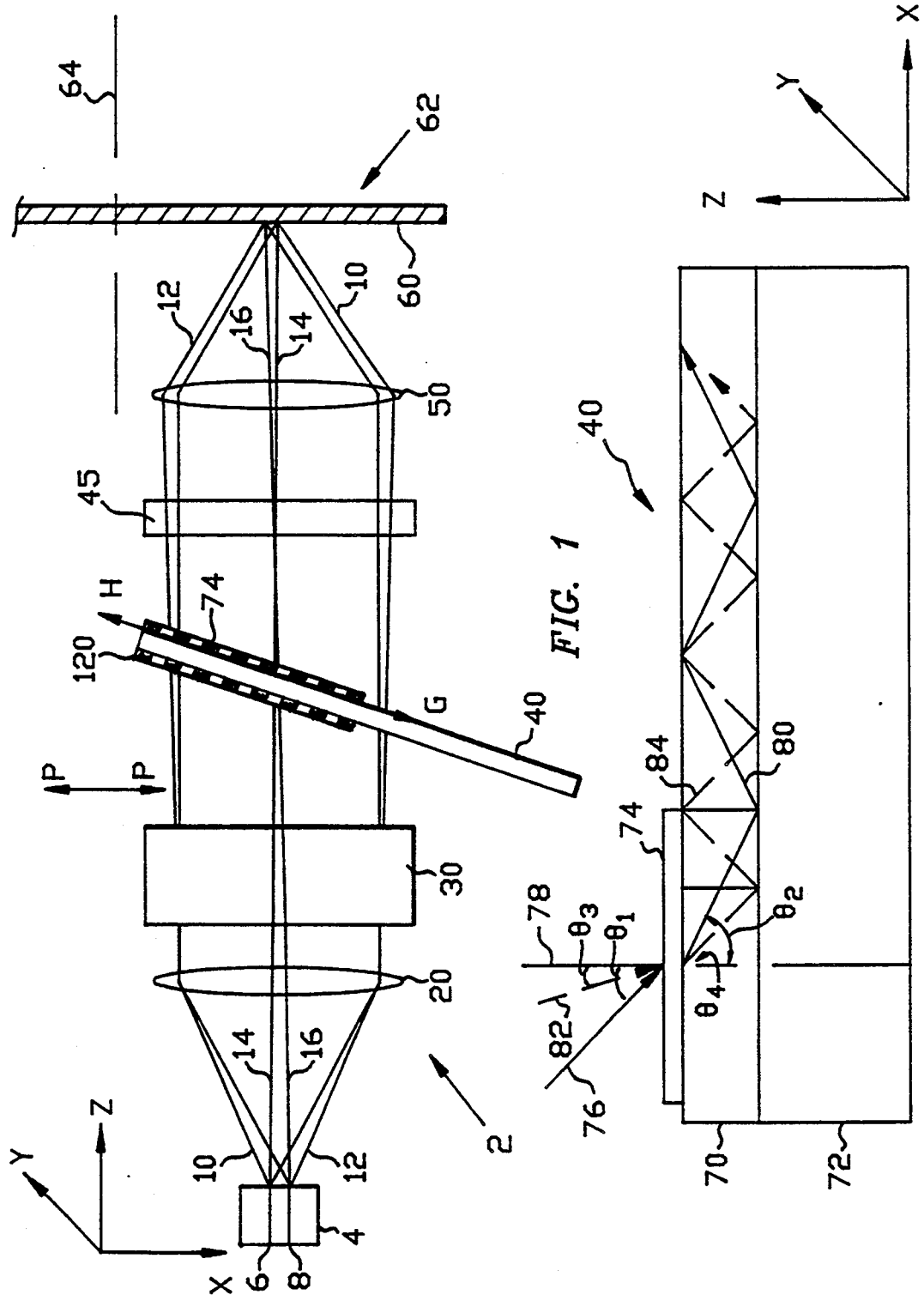

MULTI-CHANNEL OPTICAL HEAD AND DATA STORAGE SYSTEM

BACKGROUND OF THE INVENTION

The present invention relates to optical data storage, and more particularly, to a data read and servo control system for a multi-channel optical data storage apparatus.

Future optical data storage drives will require increased data rates. One path to higher data rates is to increase the number of lasers that record and read information from the recording surface. If the lasers are focused on independent data tracks, the data rate increases linearly with the number of the lasers. Going from single-laser systems to multiple-laser systems complicates the optics, electronics and mechanics of the head, particularly the read channel. Therefore, an effective multi-channel optical head and data read system for a multiple-laser optical storage device would be desirable. Preferably, the system will be simple in design, readily manufacturable and easy to maintain and operate without complicated or costly optics, mechanics or electronics. In this manner, an optical data storage system of increased data rate may be advantageously realized.

SUMMARY OF THE INVENTION

In accordance with the present invention, a multi-channel laser optical head is provided for reading multiple information from an optical data storage medium having machine readable information encoded thereon in a plurality of data tracks or channels. The optical head is positionable to transmit a plurality of focused laser output beams to the data storage medium at a focal distance from the optical head. Each laser output beam corresponds to a data track or channel on the storage medium. The storage medium reflects the incident beams as a plurality of information modulated, return beams. The return beams are reflected back to the optical head for processing therein.

The optical head includes a multiple channel laser optical source for generating a parallel array of spatially separated, laser output beams. These multiple beams are directed through an optical system within the optical head and prepared for output to the optical data storage medium. The optical system is formed by a linear array of optical components, preferably including a collimator, a beam shaping optics module, a waveguide structure, a quarter-waveplate and an objective lens.

The collimator is positioned to receive its input from the laser optical source and to transmit a plurality of collimated laser output beams. A beam shaping optics module receives the collimated laser output beams and produces a plurality of shaped laser output beams. The shaped laser output beams pass through the waveguide structure which preferably allows most of the incident light to pass unhindered. An objective lens is positioned at the output of the optical head. The objective lens receives the shaped laser output beams and focuses the beams on the optical data storage medium positioned at the focal distance.

The objective lens receives a plurality of information encoded, return beams reflected from the data storage medium. An optical waveguide structure is positioned to receive the modulated return beams transmitted through the objective lens to produce a plurality of redirected, spatially separated signal beams. Optionally, a quarter-waveplate is positioned between the optical waveguide structure and the objective lens to alter the polarization vector of the information modulated signal beams relative to the initial unmodulated laser source beams, so as to assure high optical efficiency from laser to disk. A plurality of optical detectors are positioned to receive the spatially separated signal beams generated by the optical waveguide structure and to produce a plurality of output signals representing information contained on the optical data storage medium. In a preferred aspect, the optical waveguide structure forms an integrated optical read channel that redirects and separates the data signals of the multiple lasers. The read channel includes focus error sensors and track error sensors. As proposed, the optical head may be used for amplitude recording systems such as phase-change erasable and write-once media, ablation media, dye-polymer media, and OD-ROM systems.

BRIEF DESCRIPTION OF THE DRAWINGS

FIG. 1 is a diagrammatic side view of a multichannel optical storage head including a data read channel constructed in accordance with the present invention. The head is shown transmitting laser light to and from a fragment of an optical storage disk shown in section.

FIG. 2 is a detailed diagrammatic side view of a planar waveguide structure constructed in accordance with the present invention.

DETAILED DESCRIPTION OF THE PREFERRED EMBODIMENTS

Figures 1A, 5:
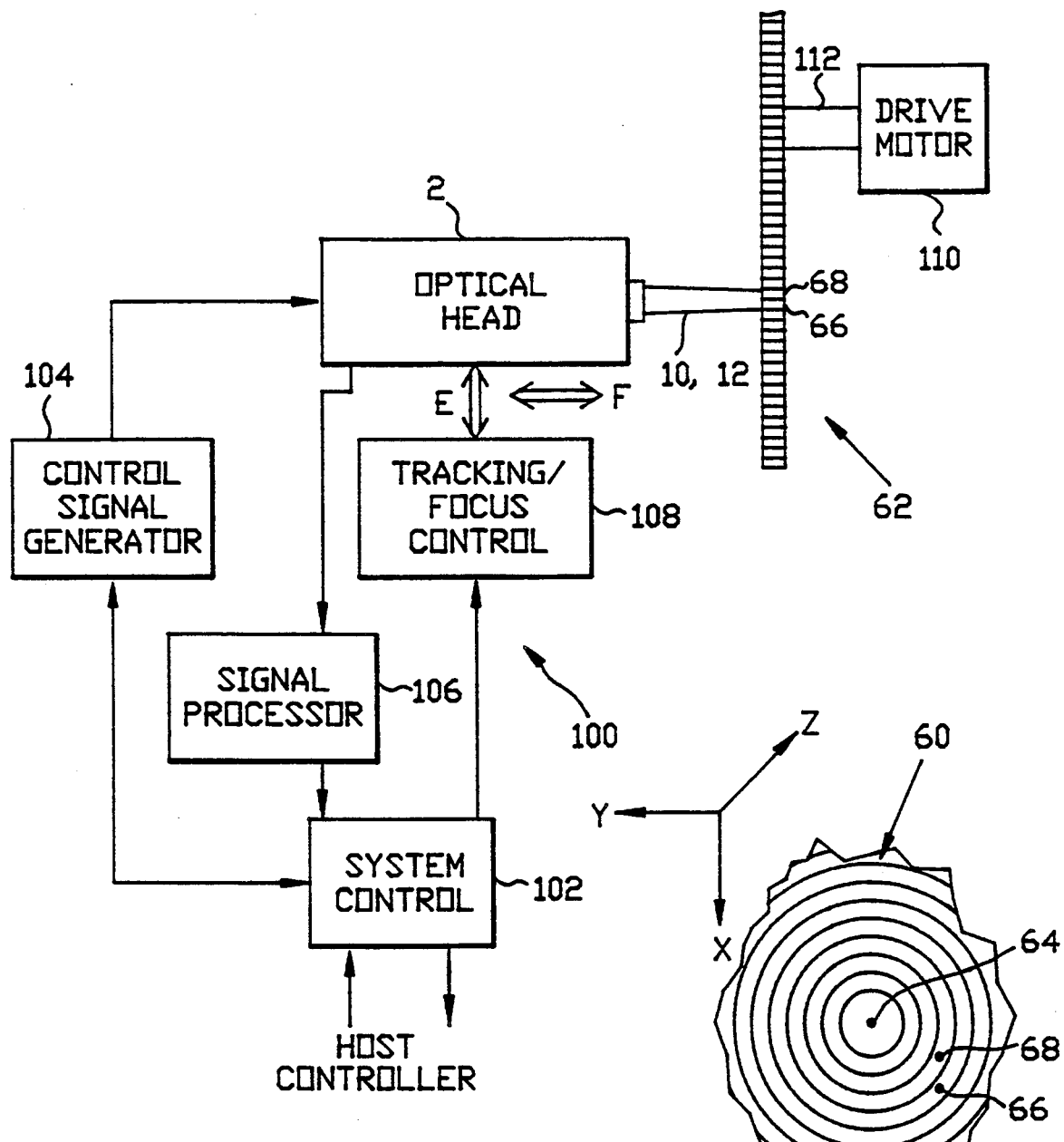
FIG. 1A is a fragmentary plan view of the optical storage disk of FIG. 1 showing the recording surface thereof.
FIG. 5 is a diagrammatical view of the present invention.

Referring now to FIG. 1, a multiple laser optical head 2 includes a multiple beam laser source 4 which may be advantageously constructed from one or more semiconductor laser devices of conventional design. For example, the laser source 4 may include one or more GaAlAs lasers operating at a laser wavelength about 830 nm. The laser source 4 provides a linear array of independent laser channels, only two of which, designated by reference numbers 6 and 8, are illustrated for simplicity. The laser channels 6 and 8 are spaced to produce respective divergent laser beams 10 and 12 having respective beam axes 14 and 16 that are angled with respect to each other. The laser beams are polarized in the plane defined by the axes 14 and 16, as illustrated by the double-headed arrow designated P in FIG. 1. The arrow P extends along the X-axis illustrated as an orientational reference in the FIGURE.

A lens collimation system 20 collects and collimates the light from the laser source 4, including the beams 10 and 12 from the laser channels 6 and 8. The lens collimator is conventionally formed as a single element glass lens with at least one aspheric surface using existing glass molding technology. The collimated light is transmitted through a beam shaping optics system 30. Because the collimated beam cross-sections are elliptical, the beam shaping optics system preferably includes a pair of prisms oriented to change the elliptical shape of the collimated beams to a circular cross-sectional shape. The construction of the optics module 30 is conventional in nature. The light is thereafter passed through a waveguide read channel system 40 which is inserted into the beam at a selected angle between the beam shaping optics system 30 and a quarter-wave plate 45. The quarter-wave plate is appropriately oriented to convert the linearly polarized incident light to circularly polarized light. The light passing through the quarter-waveplate 45 is focused on a media recording surface 60 by an objective lens 50.

The recording surface 60 is formed as part of an optical storage disk 62 which is mounted for rotation about a rotational axis 64, aligned with the Z-axis shown in FIG. 1. As shown in FIG. 1A, the recording surface 60 has a plurality of spaced data tracks or channels 66, 68 and so on, formed thereon. These data channels correspond to the laser beam channels, e.g., channels 6 and 8, such that each laser beam 10 and 12 is oriented to impinge on a corresponding data channel 66 and 68, and so on. The laser output beams imparted to the recording surface are modulated in conventional fashion and reflected back into the optical head as a plurality of modulated signal return beams. The return beams reflected from the recording surface 60 are collected by the objective lens 50 and directed to the read channel system 40, through the quarter-wave plate 45.

The lens 50 is made in the same manner as the collimator 20. By way of example, the lens 50 may have a focal length of 3.9 mm and a numerical aperture (NA) of 0.55. The quarter-waveplate is also conventionally formed from a suitable birefringent material, such as quartz. In conventional fashion, the quarter-waveplate converts the circularly polarized light reflected from the disk to linearly polarized light having a polarization direction along the Y-axis shown in FIG. 1. The Y-axis polarized return beams impinge upon the optical waveguide structure 40.

As illustrated in FIG. 1, the light associated with each return beam travels at a different angle relative to the Z-axis. This angular separation of the signal beams is utilized by the read channel system 40 to separate the data signals.

Referring now to FIG. 2, the read channel system 40 includes a multi-mode waveguide structure 70 formed on a substrate 72. The waveguide 70 and substrate 72 may be fabricated in accordance with well-known construction methods, the details of which will be apparent to those skilled in the art. For example, the substrate 72 can be made from a variety of optically transparent materials, such as glass, saphire, lithium tantalate, lithium niobate thermally oxidized silicon and gallium arsenide (GaAs). These materials are acceptable due to their ability to transmit light energy at wavelengths of interest. The waveguide structure 70 is formed as a thin film that is deposited or diffused on the substrate 72. In a preferred construction, the film may be sputter coated and thereafter laser annealed to the substrate. To achieve an effective waveguide, the thickness of the waveguide structure 70 should be within an order of magnitude of the wavelengths of interest. For example, a waveguide thickness of about 6.5 micron may be used for 830 nm wavelengths transmitted in the transverse electric (TE) mode. The material deposited on the substrate must have an index of refraction that is higher than that of the substrate. Waveguide materials such as polymethylmethacrylate (PMMA), silicon nitride, polymide or Corning 7059 glass film, may all be used provided that a substrate material having a lower index of refraction is also selected. For example, an effective waveguide structure can be made by sputter coating a film of Corning 7059 glass film, having a refractive index of 1.55, on a quartz substrate having an index of refraction of 1.46.

The read channel system 40 further includes a coupling grating 74 formed on the upper surface of the waveguide 70 (i.e., the rearward face of the waveguide structure 40 in FIG. 1), preferably by embossing or etching. The coupling grating 74 may be constructed by forming a photoresist mask on the surface of the waveguide 70 with known photolithographic techniques and thereafter ion etching to convert the exposed waveguide surface into a grating configuration. The coupling grating 74 is preferably configured to operate as a TE coupler (provided the waveguide is also constructed for the TE modes). Thus, the grating 74 will diffract the Y-axis polarized return beams incident at discrete angles into a plurality of TE modes propagating in the waveguide 72. Alternatively, the coupling grading could be implemented to operate as a transverse magnetic (TM) coupler, provided the waveguide is also constructed for the TM modes and provided further that the light incident from the laser source 4 is polarized in the direction of the Y-axis shown in FIG. 1. For simplicity, the ensuing discussion assumes that the TE coupling is used.

The coupling grating 74 is advantageously constructed to pass the X-axis polarized light incident from the laser source 4 and to couple the Y-axis polarized light reflected from the disk into the waveguide 70. As shown in FIG. 2, the coupling grating 74 is designed to couple the beams 76 and 82 incident at angles $\Theta_1$ and $\Theta_3$ into two TE modes of the waveguide 70. The light beam 76 is incident on the coupling grating 74 at the angle of incidence $\Theta_1$ with respect to an axis 78 extending parallel to the Z-axis. The Z-axis is illustrated in FIG. 2 as extending normal to the X-Y plane of the waveguide structure 70. The light beam 76 is diffracted by the coupling grating 74 at the angle $\Theta_2$ and is carried by the waveguide 70 as a low-order waveguide mode (beam 80). The light beam 82 is incident on the coupling grating 74 at the angle of incidence $\Theta_3$ with respect to the axis 78 and is diffracted at the angle $\Theta_4$ and carried by the waveguide as a high-order beam 84 illustrated as a broken line. The angles $\Theta_1$ and $\Theta_3$ are the mode coupling angles of incidence of the coupling grating 74 and the waveguide 70. Thus, the coupling grating 74 couples TE light traveling at specific mode coupling angles of incidence into different modes in the waveguide structure 70. (The beam paths shown are only illustrative). The ray angles associated with the wave guide modes are typically quite high, i.e., approaching 90 degrees for the lowest-order mode. Accordingly, the pitch of the coupling grating 74 is quite fine, e.g. about 530 nm for wavelengths of about 830 nm for a 6.5 micrometer thick Corning 7059 waveguide deposited on a quartz substrate. The angles of incidence are typically low. For example, a typical range of angles of incidence would be from about 0.99 degrees for the zero-order mode to about 5.27 degrees for higher-order modes.

Figure 3:
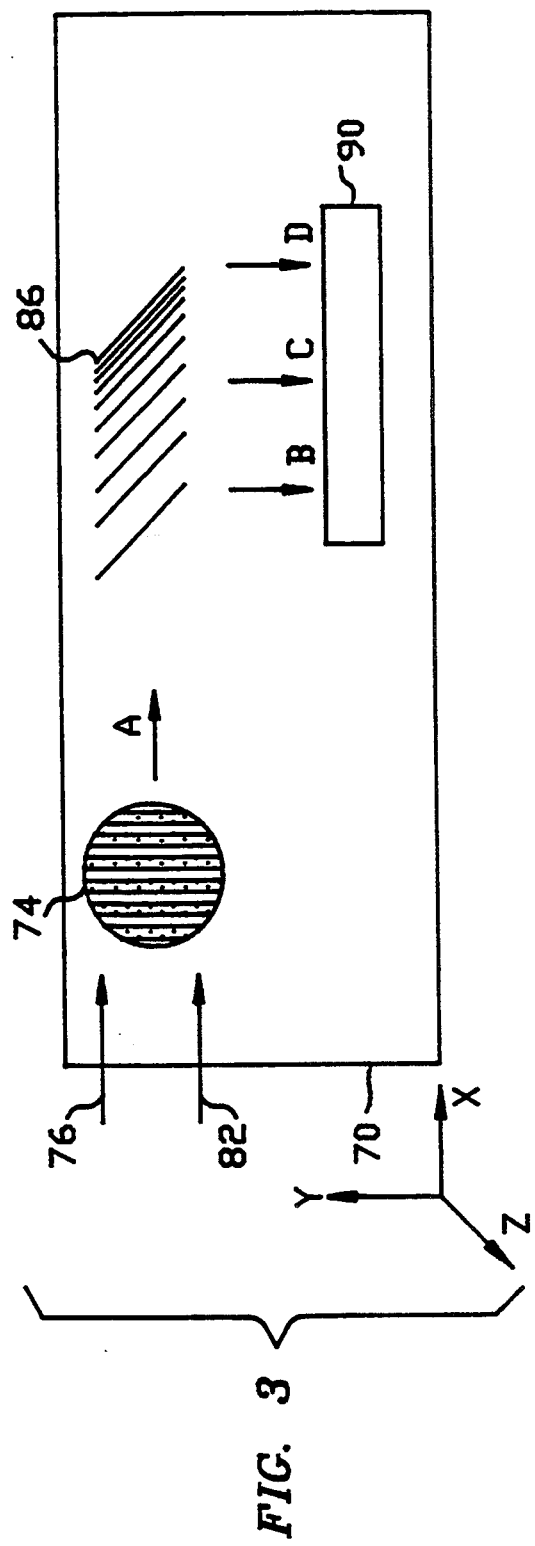
FIG. 3 is a diagrammatic top plan view of the planar waveguide structure of FIG. 2.

Turning now to FIG. 3, after the light is coupled into the waveguide, a chirped grating 86 spatially separates the modes and directs the light for detection. In FIG. 3, the waveguide 70 is shown as being of generally rectangular configuration in the X-Y plane. The coupling grating 74 may be formed as a generally circular region pattern of parallel gratings oriented in the direction of the short sides of the waveguide 70. The chirped grating 86 is formed by conventional etching or the like as a series of parallel gratings oriented at an angle, e.g., 45 degrees, to the orientation of the coupling grating 74 in the X-Y plane. As shown in FIG. 3, the period of the chirped grating 86 decreases in the direction of the X-axis as the distance from the coupling grating 74 increases. The multiple coupled light modes transmitted through the waveguide 70 are illustrated by the arrow A in FIG. 3. These multiple modes are incident on the "chirped" grating 86, which has its grating lines tilted at 45 degrees with respect to the propagation axis of the waveguide modes. In addition, the period of grating 86 varies linearly along its length; hence, the name chirped grating. The chirped grating 86 causes each waveguide mode to diffract out perpendicular to the original direction of its propagation at a different locations along the grating. The discrete orders of waveguide modes diffracted out by the chirped grating 86 are illustrated by the arrows B, C, and D in FIG. 3. Each diffracted mode is then focused by its corresponding waveguide lens onto its own detector. Thus, incident light modes are deflected at an angle, e.g., 90 degrees, in the X-Y plane. The incident light modes will be reflected at the Bragg matched grating pitch at distances from the coupling grating 74, in the direction of the X-axis, depending on the mode of the light in the waveguide 70. The grating pitch required to deflect each mode may be readily determined from the relationship:

$$2N_m \sin \Theta = W/P_m$$

where, $N_m$ = Mode Index $\Theta$ = Angle of Incidence

W = Wavelength

Pm = Grating Pitch

The highest order modes (which have the lowest mode index) will be deflected by the portion of the chirped grating 86 having the longest period. The lowest order modes (which have the highest mode index) will be deflected by the portion of the chirped grating 86 having the shortest period. Intermediate order modes will be deflected at intermediate period portions of the chirped grating 86. The high order, intermediate order and low order deflected modes are illustrated by the respective arrows B, C and D in FIG. 3.

Figure 4:
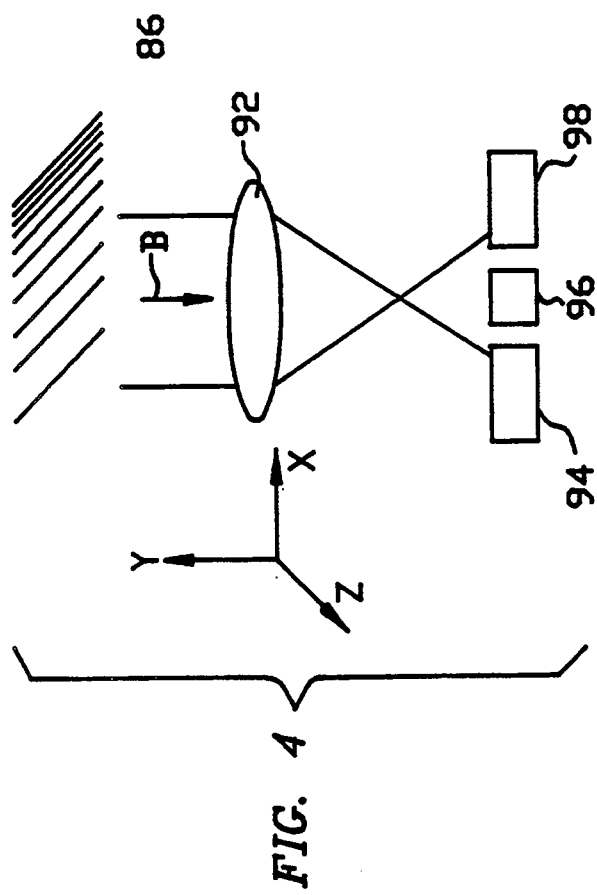
FIG. 4 is a diagrammatic view of a data and servo detector assembly used in conjunction with the planar waveguide structure of FIG. 2.

Data is detected by integrating the energy in each separated mode into an array 90 of independent data/servo detectors. One or all of the detectors are segmented to detect focus and tracking error signals. One possible geometry for these detectors is shown in FIG. 4. The detector array 90 thus includes a plurality of channel structures each including a waveguide lens 92 and a segmented detector having detector elements 94, 96 and 98. The waveguide lens 92 functions as a beam separator focusing device that directs and focuses a deflected output mode such as the mode B from the chirped grating 86 to the detector elements while excluding components from other deflected modes, such as the modes C and D. The waveguide lens 92 may be formed in accordance with conventional techniques as a buried grating or an integrated optical overlay lens formed directly on the waveguide 70. The light represented by each mode channel is incident, via a waveguide lens, on the detector segments in varying intensities depending on the signal strength of the beam reflected from the media surface 60, the position of the optical head 2 relative to the data tracks (tracking error) and the focal distance of the objective lens 50 from the media surface 60 (focus error). The detector segments 94, 96, and 98 are photosensitive diodes of conventional design which produce an electrical output signal whose amplitude is proportional to the intensity of the incident light thereon. Preferably, the detectors 94, 96 and 98 are integrally fabricated on the substrate 72.

Using the detectors 94, 96, and 98, a focus signal may be derived from a one-dimensional spot-size measurement (SSM). The focus error signal (FES) is calculated by comparing the output signals from the detector segments in accordance with the relationship:

$$(94+98)-96$$

Note the FES is un-normalized because it has been determined that un-normalized SSM signals exhibit less tracking signal feedthrough than normalized signals. The tracking error signal is calculated by comparing the detector output signals in accordance with the relationship:

$$(94-98)/(94+98)$$

Similarly, the data signal is represented by the sum of the signal outputs of the detector segments:

$$(94+96+98).$$

Segmented servo detectors are preferably placed on each of the detection channels. This allows for the generation of skew error signals and subsequent correction which, in the case of a two beam system, could be accomplished by rotating the optical head such that both beams are properly positioned over their respective data tracks. Alternatively, for systems with one master track and multiple slave tracks (i.e., tracks having no tracking servo datums), one detector could be segmented and the remaining detectors would have one photosensitive diode. Preferably, the detector array 90 will be fabricated on the substrate 72 to provide a fully integrated data read channel. Such fabrication could be readily achieved using conventional semiconductor fabrication methods.

The optical head 2 is preferably incorporated in an optical storage system such as the system 100 shown in FIG. 5. The system 100 includes a system control unit 102 in communication with a host controller (not shown). The system control unit 102 also is in communication with a control signal generator 104, a signal processor 106 and a tracking/focus control module 108. The optical head 2 is positioned adjacent the disk 62, which is rotatably driven by a motor 110 through a spindle 112. The position of the optical head 2 relative to the disk 62 is controlled by the tracking and focusing control module 108. In a preferred embodiment of the optical head 2, all of the elements illustrated diagrammatically in FIG. 1, except the optical storage disk 62, are physically supported in a common frame or housing illustrated as the rectangle designated "Optical Head" in FIG. 5. Of course, this allows all components of the optical head to be conveniently moved together along the axes E and F.

To read data from the storage medium 62, the host controller sends a read request signal to the system control unit 102. The control unit 102 controls the control signal generator 104 to energize the multichannel laser source 4 in the optical head 2. As shown in FIG. 1, the laser source 4 emits plural laser beams, including beams 10 and 12. The beams 10 and 12 are directed through the collimator 20 and the beam shaping optics 30 to the data read channel 40. The light that is transmitted through the read channel 40 and the quarter-waveplate 45 is focused on the media surface 60 by the focusing element 50. That light is in turn reflected back as a modulated data signal through the focusing lens 50 and the quarter-waveplate 45, to the read channel 40.

As previously stated, the spacing of the laser channels 6 and 8 is chosen so the angular separation of the beams 10 and 12 after reflection from the media surface and through the objective lens 50, is equal to the mode coupling angles of the coupling grating 74 and the multi-mode waveguide 70. The return beams strike the coupling grating 74 in a TE polarization orientation and a portion of each angular component incident at a coupling angle is coupled into the waveguide 70. The coupled light propagates to the chirped grating 86 in the direction illustrated by the arrow G in FIG. 1, or A in FIG. 3, and then in the direction shown by arrows B, C and D to the array 90. There, it is spatially separated and focused by the waveguide lens 92 onto the data and servo detectors 94, 96 and 98, as described above.

The outputs of the detectors 94, 96 and 98 of the array 90 are directed to the signal processor 106 and system control unit 102. Data signals representing the information on the media surface 62 are transmitted to the host controller. Tracking error and focusing error signals are sent from the system control unit to the tracking/focus control unit 108, which controls the position of the optical head 2 in the direction of the double headed arrows E and F. The direction designated by the arrow E represents a tracking control direction, whereas the direction designated by the arrow F represents a focusing control direction.

An advantage provided by the data storage system of the present invention is the ability to accurately monitor the power output of the laser source 4 at several locations. For example, if a semiconductor laser is utilized, laser power can be monitored in the laser itself, i.e., at the rear laser facet. In that case, reflections from the media surface 60 are prevented from adversely affecting the power monitoring function by the quarter-waveplate 45. The quarter-waveplate rotates the polarization direction of the return beam by 90 degrees such that the return beam is prevented from passing through the TE coupling grating 74 and returning to the laser source 4. To achieve this effect, the coupling efficiency of the grating 74 should be as close to 100 percent as possible.

An alternative power monitoring approach is to allow a portion of the incident laser beams to be diverted by the waveguide structure 40 in the direction of the arrow H shown in FIG. 1 to a plurality of detectors. This can be achieved by slightly rotating the coupling grating in the X-Y plane such that the power of the detectors will be $\sin^2(\Theta)$ where $\Theta$ is the rotation angle. Alternatively, a weak transverse magnetic (TM) coupler grating 120 could be placed on the forward face of the waveguide structure 40. The coupler 120 would couple a portion of the Y-axis polarized incident beams 14 and 16, e.g. 30 percent, into the waveguide 70, in the direction of the arrow H. The remaining portion of the incident beams 14 and 16, e.g. 70 percent, would pass through the coupler 120. TM couplers are known and their implementation in the manner proposed herein need not be described in further detail. The power monitor detectors may be integrated on the substrate 72 in the same manner as the detectors 94, 96 and 98.

When the data storage system of the present invention is used in magneto-optical recording, wherein information is read by shifts in polarization direction, it may be further advantageous to employ two adjacently stacked multi-mode waveguide structures each constructed in the manner described above with one waveguide operating using the TE modes of the waveguide and the other using the TM modes. In this configuration, better signal-to-noise characteristics would be expected as discussed in U.S. Pat. No. 4,868,803.

While a preferred embodiment of a multi-channel optical storage head for a data system has been described, it will be understood that modifications and adaptations thereof may occur to persons skilled in the art. Therefore, the protection afforded the invention should not be limited except in accordance with the scope of the following claims and their equivalents.

We claim:

1. A multi-channel laser optical system for reading information on an optical storage medium having machine readable information encoded thereon, the optical system being adapted to transmit a plurality of focused laser output beams to the optical storage medium so that the optical storage medium receives the focused laser output beams at a selected focal distance, and reflects a plurality of information modulated signal beams for processing, the optical system comprising:

a multiple channel laser optical source for generating a plurality of spatially separated laser output beams;

an objective lens positioned to receive said laser output beams and to focus said laser output beams at the selected focal distance from said objective lens, said objective lens also being positioned to receive a plurality of information modulated signal beams reflected by an optical storage medium positioned at said focal distance, and to transmit said information modulated signal beams toward said laser optical source;

a multi-mode optical waveguide structure positioned to receive said information modulated signal beams and to produce a plurality of redirected, spatially separated signal beams;

means for orienting and coupling said information modulated signal beams into said optical waveguide structure in a plurality of different modes; and a plurality of optical detectors positioned to receive said spatially separated signal beams from said optical waveguide structure and to produce a plurality of output signals representing information contained on said optical data storage medium.

2. The optical system of claim 1 wherein said optical waveguide structure includes means for spatially separating said modes for output.

3. The optical system of claim 1 wherein said optical waveguide structure is positioned to receive said information modulated signal beams for coupling said signal beams into a plurality of modes based on the angle of incidence of said signal beams with respect to said waveguide structure, and for redirecting said coupled signal beams for output.

4. The optical system of claim 1 wherein said optical waveguide structure includes a waveguide having an input coupler grating positioned to receive said signal beams for coupling said signal beams incident at selected angles of incidence into said waveguide in a plurality of coupled modes, and an output coupler grating for spatially separating said plurality of coupled modes for output to said optical detectors.

5. The optical system of claim 4 wherein said waveguide is formed on a substrate and wherein said input coupler grating is a transverse electric grating mounted on said waveguide at a first position and said output coupler grating is a chirped grating mounted on said waveguide at a second position.

6. The optical system of claim 1 wherein said optical detectors are segmented detectors.

7. The optical system of claim 1 wherein said optical detectors include segments producing output signals representing data signals, focus signals and tracking error signals.

8. The optical system of claim 1 wherein said optical detectors include first, second and third light sensitive detector segments, and wherein data signals are represented by the sum of each of the detector segment outputs, wherein focus error signals are represented by the sum of the first and third detector segment outputs minus the second detector output, and wherein tracking error signals are represented by the difference between the first and third detector segment outputs divided by the sum of the first and third detector segment outputs.

9. The optical system of claim 1 wherein said optical detectors include a plurality of segmented detectors each positioned to receive one of said signal beams, and said optical system includes means for generating skew error signals.

10. The optical system of claim 1 wherein said optical detectors include one segmented detector corresponding to a master track and a plurality of non-segmented detector corresponding to a plurality of slave tracks.

11. A method for reading data from an optical storage medium rotating about a central axis and having information-containing data channels on a surface thereof, said method comprising the steps of:
   activating a multiple laser optical source to generate a plurality of spatially separated laser output beams;
   producing a plurality of reflected signal beams by directing said plurality of spatially separated laser output beams to the optical storage medium such that each laser beam strikes a respective data channel on the storage medium;
   directing said reflected signal beams to a multi-mode optical waveguide positioned to receive said reflected signal beams to produce a plurality of redirected, spatially separated and modally discrete signal beams; and
   directing said spatially separated signal beams to a plurality of optical detectors positioned to receive said spatially separated signal beams and to produce a plurality of output signals representing the information contained on said optical data storage medium.

12. The method of claim 11 including the steps of directing said reflected signal beams to said optical waveguide at a plurality of angles, coupling said reflected signal beams into said optical waveguide in a plurality of said discrete modes, and spatially separating said modes for output.

13. The method of claim 11 including the steps of directing said reflected signal beams to said optical waveguide positioned to receive said reflected signal beams, coupling said reflected signal beams into a plurality of said discrete modes in said optical waveguide based on the angle of incidence of said reflected signal beams with respect to said optical waveguide, and redirecting said coupled reflected signal beams to a modal separator for output.

14. The method of claim 11 including the steps of directing said reflected signal beams to said optical waveguide, inputting said reflected signal beams in an input grating positioned to receive said reflected signal beams to couple said reflected signal beams incident at selected angles of incidence on said input grating into said optical waveguide in a plurality of said discrete modes, propagating said coupled reflected signal beams along said optical waveguide to a modal separation output grating, outputting said reflected signal beams from said output grating in spatially separated form, and directing said reflected signal beams to said optical detectors.

15. The method of claim 14 including the steps of directing said reflected signal beams to said optical waveguide, inputting said reflected signal beams to an input coupler grating mounted on said optical waveguide at a first position, and outputting said reflected signal beams from an output coupler mounted on said optical waveguide at a second position.

16. An optical system, comprising:
   an optical storage medium having multiple data channels containing machine readable information defined on the surface thereof;
   means for rotating said optical storage medium about a central axis;
   beam source means for generating and directing a plurality of incident light beams to said optical storage medium, so that said incident light beams respectively strike said multiple data channels;
   beam redirecting means for (1) receiving said incident beams in a first direction and allowing them to pass transversely therethrough, (2) receiving light reflected from said data storage medium representing reflected signal beams in a second direction substantially opposite to said first direction, and (3) redirecting said reflected signal beams by modal separation into a plurality of spatially separated output beams in a third direction;
   optical detector means for receiving said separated output beams and for providing a plurality of output signals corresponding to said output beams; and
   circuit means for processing said output signals into a plurality of machine readable data signals.

17. The optical system of claim 16 wherein said beam redirecting means includes a multi-mode waveguide oriented to extend in said third direction and positioned to receive said reflected signal beams, to couple said reflected signal beams into a plurality of modes based on the angle of incidence of said reflected signal beams with respect to said waveguide, and to redirect said reflected signal beams to a modal separator for output.

18. The optical system of claim 16 wherein said beam redirecting means includes a waveguide oriented to extend said third direction and having an input coupler grating and a chirped output grating, said input grating being positioned to receive said reflected signal beams and to couple said reflected signal beams incident at selected angles of incidence into said waveguide in a plurality of coupled modes, said waveguide propagating said coupled reflected signal beams to said output grating and said output grating spatially separating said plurality of coupled modes for output to said optical detector means.

19. The optical system of claim 18 wherein said multimode waveguide is formed on a substrate and wherein said input coupler grating is mounted on said waveguide at a first position and said output coupler is mounted on said waveguide at a second position.

* * * * *